April 28, 1942.  F. M. CRAYTON  2,281,482
COUPLING
Filed March 30, 1940  2 Sheets-Sheet 2
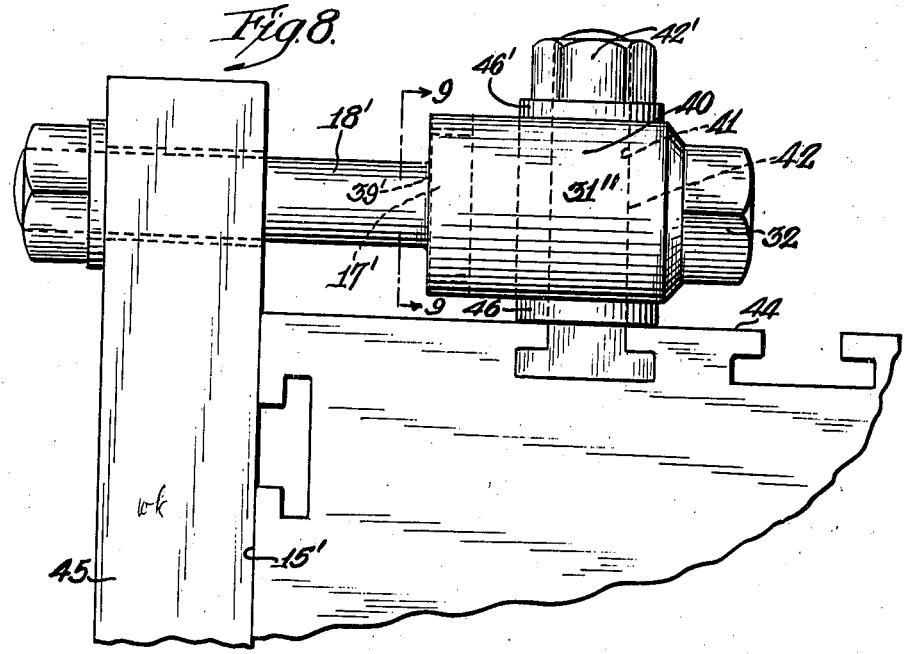
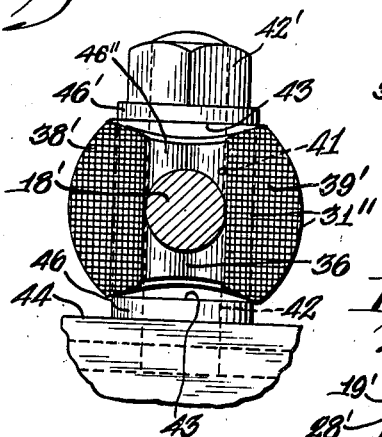
Inventor
Foster M. Crayton Patented Apr. 28, 1942

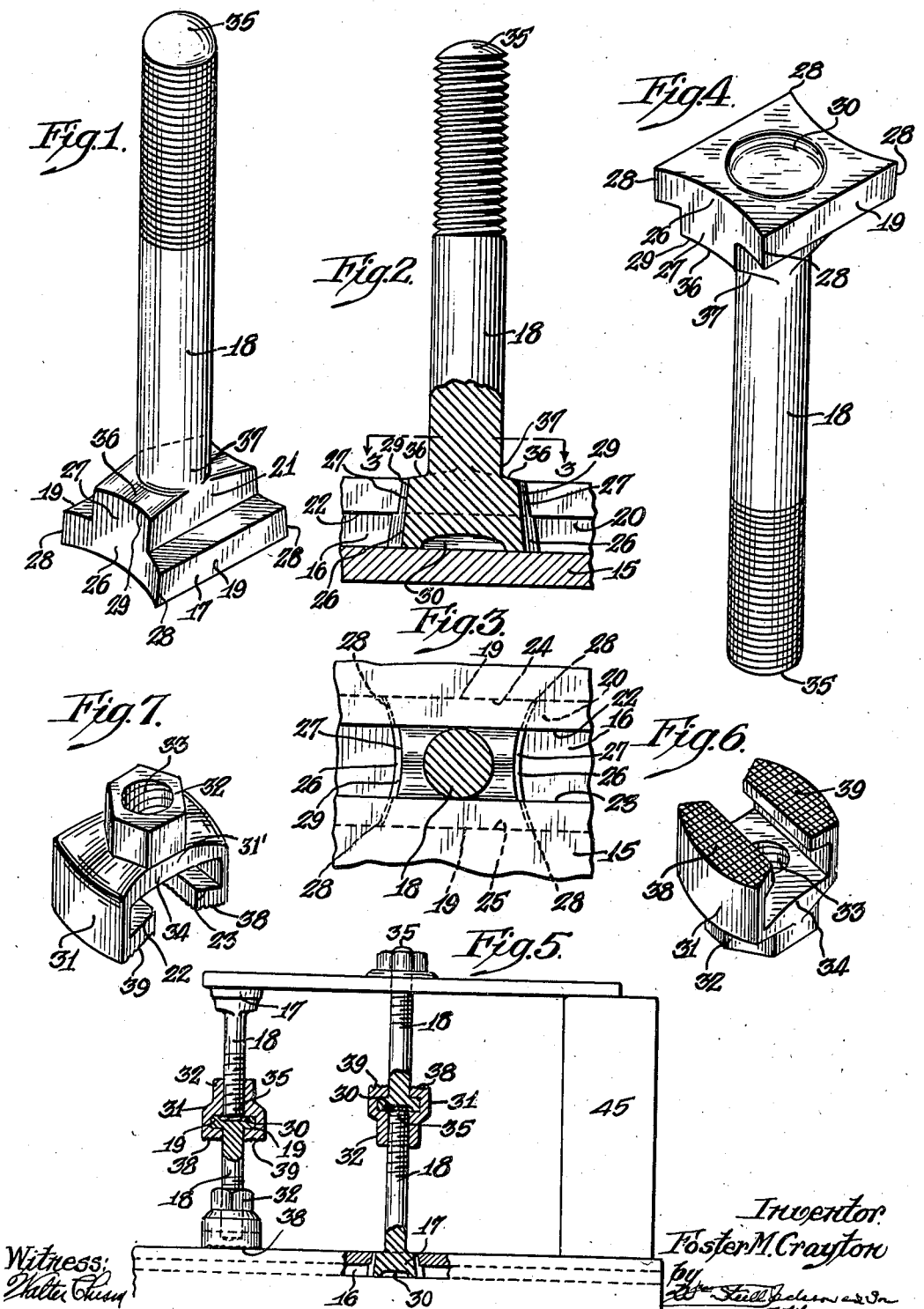

2,281,482

UNITED STATES PATENT OFFICE 2,281,482

COUPLING

Foster M. Crayton, Philadelphia, Pa.

Application March 30, 1940, Serial No. 326,949

8 Claims. (Cl. 90—59)

My invention relates to the art of work-holders for machine tools.

One purpose of my invention is to provide a clamping bolt for use, for example, in the slot of a planer, having concave head faces looking in the direction of the slot length.

A further purpose is to provide sloping forward and rear head faces for a T-bolt head or T-nut adapted to fit into the slot of a machine tool bed, such as a planer bed.

A further purpose is to free a T-bolt or T-nut from interference by chips in its movement along the length of a machine tool slot by concaving the face of the bolt, thus gathering the chips together toward the transverse center line of the slot, and to guide the chips so gathered upwardly out of the slot by sloping the end faces of the bolt head upwardly and inwardly.

A further purpose is to provide a T-nut corresponding generally with a T-bolt for fitting into a slot, but presenting a threaded opening within the slot and not a bolt.

A further purpose is to provide a coupling for clamping bolts used in work-holders, whereby the effective length of the holding bolt is extended, the coupling having threaded engagement with one bolt and transverse slot and bolt head engagement with the other bolt.

A further purpose is to provide a coupling for joining two bolts having threaded engagement with one bolt and transverse head and slot engagement with the second bolt and having the second bolt locked in transverse position within the coupling slot by engagement between the end of the first bolt and the head of the second bolt.

A further purpose is to provide a base for a packing piece, commonly known as a hell block, for work clamping use, having a nut for bolt engagement at the upper end of the base, laterally and downwardly extended at its lower end, and with a transverse slot in the bottom.

A further purpose is to provide a combined coupling and hell block base suited to receive a bolt at one end and laterally extended and transversely slotted at the other end to receive the T-head of a second bolt, the head of the second bolt being recessed to receive the end of the first bolt for centering and clamping purposes.

A further purpose is to provide a special slotted block and nut for supplemental use in support of work upon a table.

Further purposes will appear in the specification and in the claims.

Figures 1 and 4 are perspective views taken from different positions showing a bolt used by me.

Figure 2 is a side elevation, partly sectioned, of the bolt of Figure 1.

Figure 3 is a section upon line 3—3 of Figure 2.

Figure 5 is a side elevation, partly sectioned, showing a work clamp, bolt and hell block in position clamping work on a bed.

Figures 6 and 7 are perspectives from different positions of a combined coupling and hell block base.

Figure 8 is a broken side elevation showing clamping structure for holding work.

Figure 9 is a section of Figure 8 taken upon line 9—9.

Figure 10 is a perspective of the fitting seen in Figures 8 and 9.

Figure 11 is a perspective view of a nut adapted to slide within the slot of a machine tool table or bed.

Figures 12 and 13 are longitudinal, transverse vertical central sections, respectively, through the nut of Figure 11.

Figure 14 is a vertical transverse section of Figure 11 near one end of the nut.

In the drawings similar numerals illustrate like parts.

In clamping work on the beds or tables of machine tools provided with slots, as in a planer bed, it has been customary for a great many years to use T-headed bolts within the slots, to pass the bolts through clamps, plates or other transverse holding devices, resting one end of the clamp against the work and to rest the other end of the clamp upon packing pieces acting as fulcrum blocks and commonly known as hell blocks.

Because of the variant heights of the parts of the work against which the clamps are to engage, it has been necessary to provide for variant lengths of clamping bolts and variant heights of fulcrum blocks, with the result that a great variety of different bolt heights is required. In order to meet this need I provide couplings between shorter bolts so that the range of bolt lengths which must be carried may be reduced. My present invention relates not only to the bolts themselves, and to a T-nut for holding of work on beds or tables. The couplings used, and the base for a built up fulcrum block or hell block are claimed in my copending application, Serial No. 408,953, filed August 30, 1941, for Coupling.

I show at 15 a fragmentary machine tool bed or table having a slot 16 (Figures 2 and 3) into which fits the T-head 17 of a T-bolt 18. As is customary the sides 19 of the bolt head are an easy transverse fit in the lower (wide) part 20 of the slot, and the stem 21 of the T-bolt is elongated in the direction of the length of the slot and forms an easy fit between the overhanging flanges 22 and 23 of the slot.

There has been difficulty in moving T-bolts lengthwise of such machine tool bed or table slots because chips and other obstructions falling into the slots become wedged between the heads 17 of the bolts and the side walls 24 and 25 of the lower (wider) parts of the slots. This occurs of course in either direction of movement of the bolt lengthwise of the slot. One feature of my invention is directed to reduction of this interference of chips, etc., with the movement of the bolt.

I concave both ends of the T-head at 26, concaving also the stem of the T as at 27. Whichever the direction of movement of the T-head along the length of the slot, this therefore provides horns 28 near the sides of the slot, with concave and preferably sloping surfaces adjacent, guiding the chips toward the lateral center line. This frees that part of the slot under the flanges from chip engagement, thus avoiding having the chips wedge between the outer limits of the bolt heads and the adjacent lower slot side walls 24 and 25.

In addition to concaving the front and rear faces of the cross of the T and the stem of the T, I slope the central portion of the bar and stem of the T adjacent the T-head upwardly and inwardly from the bottom of the bolt face to the top of the stem of the T at 29, as shown best in Figure 2. The chips which have been centered by the concavity of the end of the bolt T-head will be guided upwardly and hence outwardly of the slots by the slope.

I prefer to make the concavities of the ends of the bolt head curved in transverse section, though other transverse concavity contours than of a curve would be of benefit to attain my purpose.

Not only does the curved end draw chips to the center to the best advantage but, in end swaging rod stock into the head during manufacture, the face of the die which shapes the curvature guides and diverts the flowing metal to fill out the horns at the ends of the curves.

The bottom of the bolt under the head is recessed at 30 so that, as herein later indicated, this recess may receive the threaded end of a second bolt for the purpose of alining the bolts and rigidly holding them together.

When it is desired to use two of my bolts together a coupling 31 is used, which comprises a nut 32 at one end threaded at 33, adapted to receive the thread of one of my bolts, and a transversely slotted terminal 34 at the opposite end, adapted to receive the T-head of a second of my bolts. The slotted terminal is comparable in the slot with a portion of the length of a machine tool slot, having the same characteristics for its shorter length as those of the machine tool slot, including overhanging slot flanges, a wider slot space largely beneath the flanges and a narrower space between the flanges for the stem of the second bolt head. The ends of the slot walls are concaved at 31' to correspond generally with the concavity at 26 in the T-head ends.

When the threaded end of one bolt is passed within the thread of such a coupling, the T-head of the second body is passed within the fragmentary transverse slot of the terminal of the coupling, as shown in Figure 5. Part of the length of the threads of the lower bolt and the nut of the coupling may be used for adjustment of the height of the combined unit bolts and coupling, but more usually the nut of the coupling will be screwed down on the thread of the lower bolt to such an extent that the end 35 of the threaded part of the lower bolt will fit into the recess 30 within the head of the upper bolt. It may thus merely prevent lateral movement of the head of the second bolt in the slot or the parts may be threaded tightly against one another so as quite rigidly to hold the two bolts and clamp together in alined position.

In operation, the T-head of the bolt when moved in the slot in either direction draws the chips toward the lateral center line of the slot and, because of the upward slope, guides them upwardly and outwardly upon the top of a sloping surface 36, on the upwardly directed face of the T-stem and thus against the body of the bolt at 37 and off to one side or other of the slot.

When the coupling is used, the lower bolt, whose head travels in the bed slot, fits into the thread in the nut end of the coupling and the T-end of the upper bolt is fitted transversely into the slot in the upper end of the coupling above the lower bolt. The coupling is threaded upon the lower bolt until the upper end of the lower bolt fits tightly within the recess 30 in the head of the upper bolt. The composite bolt thus formed is then used as if it were a single bolt length.

When the coupling is intended to be used as the base or bottom of the hell block, the faces 38 and 39 are roughened to assist in preventing slippage as seen in Figure 6.

A bolt is then screwed downwardly into the nut. The bolt has additional adjustment length not only within the wider part of the now downwardly directed slot but within the space between the flanges. The flat end of the T-head of the bolt about recess 30 serves as a resting place for the fulcrum end of the strap, plate or clamp used in holding the work.

The coupling 31 of Figures 5, 6 and 7 is capable of other uses when transversely apertured. This structure is seen at 31'' in Figures 8, 9 and 10 where the coupling used as a fitting is provided with the nut 32 at one end which appears in Figures 8, 9 and 10 and with the transverse slot at the other end. However, the intermediate section 40 has been lengthened axially of the nut to form an intermediate block portion large enough to permit aperture at 41 for the passage of a bolt 42, smaller in diameter than bolt 18, transversely of the length of the fitting. The sides of the fitting are flattened at 43 adjacent the opening of aperture 41 to permit clamping of the fitting against a table 44 at right-angles to the main table 15' (Figure 8) upon which work 45 is to be clamped. Any suitable spacing washer or block 46 is inserted so that the bolt 18' will engage the work conveniently. Nut 42' rests on washer 46' and tightens the fitting so that any bolt 18' having its T-head within a slot at 46 can be used to engage the work or to engage any suitable supporting mechanism which engages the work.

The structure of Figures 8, 9 and 10 also is provided with roughened surfaces 38' and 39' so that it can act as a hell block.

This fitting gives an additional offstanding support for the work on a shaper, for example, provided with two tables where the work extends beyond the one table.

In Figures 11, 12, 13 and 14 a T-nut is provided corresponding generally with the T-head of the bolts displayed but having a threaded aperture in the position corresponding generally to the shank of the bolt in the other forms. The nut is intended to be used to receive a bolt from above for clamping purposes. Since the "stem" of the nut does not come up above the level of the table, additional T-nuts of this character can be located in the slots ready for transfer to a point of possible use without presenting the projection problem which would be offered by a bolt similarly placed. Besides this, any desired length of bolt, or more usually stud, on account of its longer possibility of easy adjustment, can then be used from above, whereas the length of bolt required might not be capable of determination at the time when the bolt would have to be selected if a bolt were to be used instead.

The fitting of Figures 8, 9 and 10 affords a supplemental anchorage available beyond the table upon which the work rests for the purpose of tightening or supporting the work thereon. This fitting may be used in other ways than the single illustration of its application which has been given.

It will be evident that the characteristics of the T-headed bolt and the T-nut are very closely similar. Both are fittings and both are devices by which connection may be made from slot-guided members which are accessible from above the bed, the bolt directly by the bolt shank and the nut by the stud or bolt engaging its socket.

The character of the front and rear facing concavity is not so important as the fact that it is concave and that it does in its final result collect and guide the chips so as to facilitate their removal from the slot.

The bolt and nut both are T-sections, the front and rear facings of the T's performing the same functions in relation to the slot and to the chips within the slot.

The T-nut 17' of Figures 11-14 has in general the characteristics of the T-head of the bolt in that it fits easily into the wide part of the slot and has the distinctive characteristics of the T-head of the bolt. Its sides 19' are easy transverse fits in the lower (wide) part 20 of the slot and the stem 21' of the T-nut is elongated in the direction of the length of the slot and forms an easy fit between the overhanging flanges 22 and 23 of a slot. The ends of the T-nut are concaved at 26' and the stem of the T-nut is concaved at 27' and at the upper portion 29' near the top 47 of the stem. It provides horns 28' and is sloped at the ends upwardly and inwardly toward the axis of its thread 48 to guide the chips outwardly from the slot.

It will be seen that the T-nut and a stud can be used together for the same purpose and in the same way as a bolt would be used but that the T-nut has a further advantage of being capable of use as a socket movable along the length of the slot and into which a stud or bolt can be put to build down from the work, as distinguished from building up from the slot in order to obtain a clamping effect.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention what I claim as new and desire to secure by Letters Patent is:

1. A fitting having T-section, adapted to move within the slot of a machine tool bed or table and having the ends of the T concaved facing in directions of the length of slot.

2. A fitting having T-section, adapted to move within the slot of a machine tool bed or table and having the ends of the T concaved to face in directions of the length of slot and the interior part of the forwardly and rearwardly facing ends sloping upwardly and inwardly to guide chips out of the slot along the stem of the T.

3. A bolt having a T-head, adapted to move within the slot of a machine tool bed or table and having the ends of the head of the T concaved to face in directions of the length of slot.

4. A bolt having a T-head adapted to move within the slot of a machine tool bed or table, having the ends of the head of the T concaved to face in directions of the length of slot and the interior part of the forwardly and rearwardly facing ends sloping upwardly and inwardly to guide chips out of the slot along the stem of the T.

5. A T-headed bolt adapted to slide within the slot of a machine bed or table and having transversely concaved front and rear T-head walls.

6. A bolt having a T-head, adapted to move within the slot of a machine tool bed or table and having the ends of the head of the T concaved to face in directions of the length of the slot, the interior part of the forwardly and rearwardly facing ends sloping upwardly and inwardly to guide chips out of the slot along the stem of the T and the outer face of the stem of the T curved transversely and also sloping inwardly toward the body of the bolt.

7. A nut adapted to slide within the slot of a machine bed or table and having concaved transverse front and rear walls.

8. A T-nut having concaved front and back faces sloping upwardly and inwardly toward the axis and a central threaded opening, the nut being adapted to slide in the slots of a machine tool bed.

FOSTER M. CRAYTON.